(12) United States Patent
Lu et al.

(10) Patent No.: US 12,378,462 B1
(45) Date of Patent: Aug. 5, 2025

(54) SEALING GEL WITH DELAYED GELATION FOR WELL CEMENTATION, PREPARATION METHOD, AND APPLICATION

(71) Applicants: CHINA UNIVERSITY OF PETROLEUM (EAST CHINA), Qingdao (CN); QINGDAO UNIVERSITY OF TECHNOLOGY, Qingdao (CN)

(72) Inventors: Chang Lu, Qingdao (CN); Huajie Liu, Qingdao (CN); Yuhuan Bu, Qingdao (CN); Doudou Wang, Qingdao (CN); Shenglai Guo, Qingdao (CN)

(73) Assignees: CHINA UNIVERSITY OF PETROLEUM (EAST CHINA), Qiang (CN); QINGDAO UNIVERSITY OF TECHNOLOGY, Qingdao (CN)

( * ) Notice: Subject to any disclaimer, the term of this patent is extended or adjusted under 35 U.S.C. 154(b) by 0 days.

(21) Appl. No.: 19/014,262

(22) Filed: Jan. 9, 2025

Related U.S. Application Data

(63) Continuation of application No. PCT/CN2024/141272, filed on Dec. 23, 2024.

(30) Foreign Application Priority Data

Feb. 7, 2024 (CN) .......................... 202410173321.5

(51) Int. Cl.
  C09K 8/44 (2006.01)
  C08F 8/30 (2006.01)
  C08K 5/17 (2006.01)

(52) U.S. Cl.
  CPC .................. *C09K 8/44* (2013.01); *C08F 8/30* (2013.01); *C08K 5/175* (2013.01); *C08F 2810/20* (2013.01)

(58) Field of Classification Search
  None
  See application file for complete search history.

(56) References Cited

U.S. PATENT DOCUMENTS 5,441,928 A * 8/1995 Albonico ............... C08K 5/175
507/239

FOREIGN PATENT DOCUMENTS

CN 102618230 A 8/2012
CN 106244108 A * 12/2016
(Continued)

OTHER PUBLICATIONS

CN116063612A, 2023, machine translation (Year: 2023).*
CN106244108A, 2016, machine translation, (Year: 2016).*

*Primary Examiner* — Satya B Sastri

(57) ABSTRACT

A sealing gel with delayed gelation for well cementation, its preparation method, and application are provided. The sealing gel with delayed gelation for well cementation includes 2-3 parts of anionic polyacrylamide, 3-4 parts of cationic acrylamide, 1 part of stabilizer, 1 part of cross-linking agent and 6 parts of distilled water; the stabilizer is obtained by the reaction of citric acid and ethylenediaminetetraacetic acid disodium under the action of initiator, the cross-linking agent is obtained by the reaction of chromium lactate and chromium nicotinate under the action of azo diisobutyl amidine hydrochloride and tetramethylethylenediamine. Based on the purpose of well cementation, the sealing gel has pH sensitivity, which prolongs the gelation time of the gel that is originally rapidly formed at a certain temperature, so that it can be added to the pre-liquid system.

4 Claims, 2 Drawing Sheets

(56) References Cited

FOREIGN PATENT DOCUMENTS

| | | | |
|---|---|---|---|
| CN | 114921236 A | | 8/2022 |
| CN | 116063612 A | * | 5/2023 |

* cited by examiner

SEALING GEL WITH DELAYED GELATION FOR WELL CEMENTATION, PREPARATION METHOD, AND APPLICATION

CROSS REFERENCE TO THE RELATED APPLICATIONS

This application is a continuation application of International Application No. PCT/CN2024/141272, filed on Dec. 23, 2024, which is based upon and claims priority to Chinese Patent Application No. 202410173321.5, filed on Feb. 7, 2024, the entire contents of which are incorporated herein by reference.

TECHNICAL FIELD

The invention belongs to the field of oilfield sealing materials, and relates to a sealing gel with delayed gelation for well cementation, preparation method, and application.

BACKGROUND

The characteristics of strong reservoir heterogeneity, large leakage space, and fluidity determine that the leakage channel is often composed of large-scale and multi-size fractures or pores. In the process of reservoir leakage, there is uncertainty in the leakage channel, which not only has a great impact on drilling efficiency, but also causes a large amount of leakage of drilling fluid. At present, the main sealing materials used for reservoir leakage are cement slurry, bridging sealing materials, flexible sealing materials, etc., but the success rate of the current sealing methods is relatively low, especially the fracture type leakage. Due to the uncertainty of the leakage channel, the conventional treatment of well leakage is not satisfactory. At present, the most commonly used sealing material for dealing with malignant leakage such as fracture and porosity is cement slurry sealing material. However, cement slurry is easy to mix with formation water after contact, so it is washed and diluted, and it is difficult to stay in the leakage layer near the wellbore. Therefore, it is difficult for cement slurry sealing agents to form a tight sealing layer with sufficient strength around the wellbore, and the sealing effect is not ideal.

The work of well cementation and sealing is to obtain better oilfield drilling results, the process of well cementation and sealing is usually to place the drilling tool into the leakage layer where the well leakage occurs first, and then pull out the drilling tool after injecting the cementing slurry. Different from the large particle sealing of drilling fluid, in order to prevent the large particles from blocking the pressure transmission hole and single flow valve of the liner hanger, the sealing materials in the cementing slurry often use materials that are not easy to jam the tools or accessories, the polymer gel sealing material is also one of the commonly used sealing materials. Considering that as long as the gelation time of the gel can be accurately controlled, the problem of being difficult to stay in the formation can be overcome by rapid solidification after reaching the target layer. Therefore, it is proposed to develop a delayed gelation gel for the pre-liquid system, which can be accurately consolidated after reaching the target layer, and is suitable for sealing in the cementing process.

SUMMARY

Given the problems existing in the existing technology, the invention proposes a sealing gel with delayed gelation for well cementation, preparation method, and application, in the construction process, the delayed gelation gel is added to the pre-liquid system, this allows precise control of the gel consolidation time, the sealing effect is good, and the construction process is reduced, which lays a foundation for the future cementing process.

The invention adopts the following technical scheme:
a sealing gel with delayed gelation for well cementation described in the invention includes 2-3 parts of anionic polyacrylamide, 3-4 parts of cationic polyacrylamide, 1 part of stabilizer, 1 part of cross-linking agent and 6 parts of distilled water; the stabilizer is obtained by a reaction of citric acid and ethylenediaminetetraacetic acid disodium under an action of an initiator; the cross-linking agent is obtained by a reaction of chromium lactate and chromium nicotinate under an action of azo diisobutyl amidine hydrochloride and TMEDA (tetramethylethylenediamine).

The initiator is sodium persulfate; in terms of mass ratio, citric acid:ethylenediaminetetraacetic acid disodium:initiator=2:1:1.

In terms of mass ratio, chromium lactate:chromium nicotinate: azo diisobutyl amidine hydrochloride:tetramethylethylenediamine=3:2:1:1.

The preparation method of the sealing gel with delayed gelation for well cementation is as follows: The specific steps are as follows:
- (2-1) dissolving the anionic polyacrylamide in distilled water and stirring evenly, and adding the cationic polyacrylamide slowly and stirring evenly to obtain a slurry II;
- (2-2) adding the stabilizer and cross-linking agent slowly to the slurry II and stirring evenly to obtain the sealing gel with delayed gelation for well cementation. In the course of the experiment, the inventor found that adding a stabilizer first can make the acrylamide monomer not agglomerate, if the cross-linking agent is added first, the viscosity of the propionamide substance with water becomes larger, and the cross-linking agent is easy to react only partially to cause agglomeration.

The preparation method of the stabilizer is as follows: dissolving the citric acid, ethylenediaminetetraacetic acid disodium and initiator in water, stirring evenly, and heating at 70° C. for 4 h. The stabilizer described in the invention is used to maintain the stability of the gel and increase the gel strength.

The preparation method of the cross-linking agent is as follows:
- (1-1) adding chromium lactate and chromium nicotinate to distilled water and stirring evenly to obtain a slurry I;
- (1-2) adding azo diisobutyl amidine hydrochloride and tetramethylethylenediamine to the slurry I, stirring and mixing evenly, and heating at 50° C. for 4 h to obtain the cross-linking agent.

In this invention, citric acid and ethylenediaminetetraacetic acid disodium generate a new compound as a stabilizer under the action of potassium persulfate, which is not a conventional single citric acid or ethylenediaminetetraacetic acid disodium, the main reason is that EDTA is a commonly used chelating agent, the use of EDTA substances (such as EDTA, EDTA-2Na, EDTA-4Na) as stabilizers alone will cause $Cr^{3+}$ in the organic chromium cross-linking agent to be chelated by EDTA to form a new compound, so that the subsequent hydroxyl bridge reaction cannot be carried out, and $Cr^{3+}$ cannot be separately dissociated to react with acrylamide substances to form a gel. The chemical reaction equation of EDTA chelating $Cr^{3+}$ is as follows:

$$Cr^{3+}+ +EDTA=Cr(EDTA)^-+4H^+$$

$$Cr^{3+}+EDTA^{2-}=Cr(EDTA)^-+2H^+$$

$$Cr^{3+}+EDTA^{4-}=Cr(EDTA)^-$$

The cross-linking agent is prepared by the reaction of chromium lactate and chromium nicotinate under the action of azo diisobutyl amidine hydrochloride and tetramethylethylenediamine. $Cr^{3+}$ and partially hydrolyzed polyacrylamide (HPAM), cationic polyacrylamide (CPAM), etc. can synthesize gels, experiments show that the cross-linking agent obtained by the invention is sensitive to pH, and the release of $Cr^{3+}$ can be controlled by controlling the pH, the delay mechanism is to control the dissociation process of the cross-linking center ion $Cr^{3+}$ to slow down the rate of hydroxyl bridge reaction of $Cr^{3+}$ and achieve delayed gelation.

The sealing gel with delayed gelation described in this invention can be used in the pre-liquid system of the cementing work, which is convenient to control the gelation time of the gel according to different conditions.

Compared with the existing technology, the invention has the following advantages:

(1) Based on the purpose of cementing, a sealing gel with delayed gelation is proposed, which prolongs the gelation time of the gel that is originally rapidly gelled at a certain temperature, after adding it to the pre-liquid system, it can be effectively blocked when it reaches the target layer, laying a foundation for subsequent cementing work.

(2) The sealing gel described in the invention is pH sensitive, and the invention realizes delayed gelation by controlling the release rate of $Cr^{3+}$ in the cross-linking agent, the pre-liquid system is a weak acid environment, when the sealing gel is in the pre-liquid system, there is no gelation, after the cement slurry is added in the later stage, the weak acid environment becomes an alkaline environment, and the gelation is realized, thereby achieving the purpose of sealing the target formation, the gel described in the invention has strong compressive strength after gelation, and the strength is relatively high, so the strength of cement stone is improved after mixing cement slurry.

(3) The invention avoids the use of $Cr^{6+}$, and avoids the problem of serious harm to the health of the operator and easy to cause environmental pollution.

DETAILED DESCRIPTION OF THE EMBODIMENTS

Figure 1:
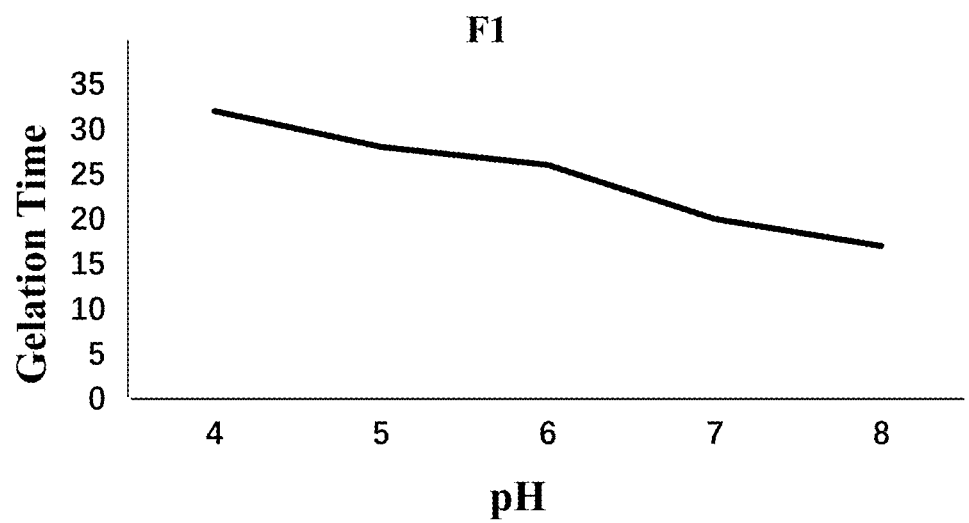
FIG. 1 is a gelation time of gel F1 under different pH conditions.

It should be noted that the following details are illustrative and are intended to provide further explanation of the invention. Unless otherwise specified, all technical and scientific terms used in this article have the same meaning as those commonly understood by ordinary technicians in the technical field to which the invention belongs.

It should be noted that the terminology used here is only to describe the specific implementation method, not to limit the illustrative embodiment according to the invention. As used here, the singular form is also intended to include the plural form unless explicitly stated in the context, in addition, it should be understood that when the terms include and/or including are used in this specification, they indicate the existence of features, steps, operations and/or combinations of them.

In order to enable the technical personnel in this field to understand the technical scheme of the invention more clearly, the following will explain the technical scheme of the invention in detail with specific implementation examples.

Example 1

The preparation steps of the cross-linking agent are as follows:

Making sure that the organic chromium cross-linking agent is sensitive to pH, in a certain pH range, the cross-linking agent center $Cr^{3+}$ can be dissociated, in terms of weight, the raw material composition is: 3 parts of chromium lactate, 2 parts of chromium nicotinate, 1 part of azobisisobutyridine hydrochloride, 1 part of tetramethylethylenediamine, and 10 parts of distilled water.

(1-1) 3 parts of chromium lactate and 2 parts of chromium nicotinate are added to distilled water and stirred evenly to obtain the slurry I;

(1-2) Azodiisobutyramide hydrochloride and tetramethylethylenediamine are added into the slurry I, stirred and mixed evenly, and heated in a water bath heating furnace at 50° C. for 4 h to obtain the cross-linking agent;

inventor mixed the cross-linking agent with distilled water, at first, the solution was basically colorless, after gradually adjusting the pH to a weakly acidic environment, the $Cr^{3+}$ in the cross-linking agent is dissociated to form a purple solution.

Example 2

The preparation steps of the stabilizer are as follows: 2 parts of citric acid, 1 part of ethylenediaminetetraacetic acid disodium, and 1 part of sodium persulfate are dissolved in 10 parts of distilled water, stirred evenly, and heated at 70° C. for 4 h to obtain the stabilizer.

Example 3

The sealing gel with delayed gelation for well cementation is composed of 2 parts of HPAM, 3 parts of CPAM, 1 part of the cross-linking agent, 1 part of stabilizer, and 6 parts of distilled water, the cross-linking agent is the cross-linking agent obtained from Example 1, and the stabilizer is the stabilizer obtained from Example 2;

the specific preparation steps are as follows:

(2-1) each raw material is weighed in proportion and reserves;

(2-2) 2 parts of HPAM and 3 parts of CPAM are mixed, 6 parts of distilled water are added and stirred well, and the stirring speed is 550 r·min$^{-1}$ to obtain the slurry II;

(2-3) 1 part of stabilizer is mixed with the slurry II and mixed well, and the stirring speed is 550 r·min$^{-1}$ to obtain the slurry III;

(2-4) the slurry III is mixed with 1 part of the cross-linking agent and stirred evenly, and the stirring speed is 550 r·min$^{-1}$ to obtain gel F1.

Example 4

The sealing gel with delayed gelation for well cementation is composed of 3 parts of HPAM, 3 parts of CPAM, 1 part of cross-linking agent, 1 part of stabilizer, and 6 parts of distilled water, the cross-linking agent is the cross-linking agent obtained from Example 1, and the stabilizer is the stabilizer obtained from Example 2;

the specific preparation steps are as follows:
(2-1) each raw material is weighed in proportion and reserves;
(2-2) 3 parts of HPAM and 3 parts of CPAM are mixed, 6 parts of distilled water are added and stirred well, and the stirring speed is 550 r·min$^{-1}$ to obtain the slurry II;
(2-3) 1 part of stabilizer is mixed with the slurry II and mixed well, and the stirring speed is 550 r·min$^{-1}$ to obtain the slurry III;
(2-4) the slurry III is mixed with 1 part of A-type organic chromium cross-linking agent and stirred evenly, and the stirring speed is 550 r·min$^{-1}$ to obtain gel F2.

Example 5

The sealing gel with delayed gelation for well cementation is composed of 2 parts of HPAM, 4 parts of CPAM, 1 part of the cross-linking agent, 1 part of stabilizer, and 6 parts of distilled water, the cross-linking agent is the cross-linking agent obtained from Example 1, and the stabilizer is the stabilizer obtained from Example 2;

the specific preparation steps are as follows:
(4-1) each raw material is weighed in proportion and reserves;
(4-2) 2 parts of HPAM and 4 parts of CPAM are mixed, 6 parts of distilled water are added and stirred well, and the stirring speed is 550 r·min$^{-1}$ to obtain the slurry II;
(4-3) 1 part of stabilizer is mixed with the slurry II and mixed well, and the stirring speed is 550 r·min$^{-1}$ to obtain the slurry III;
(4-4) the slurry III is mixed with 1 part of A-type organic chromium cross-linking agent and stirred evenly, and the stirring speed is 550 r·min$^{-1}$ to obtain gel F3.

Comparison Case 1

The sealing gel with delayed gelation for well cementation is composed of 2 parts of HPAM, 4 parts of CPAM, 1 part of cross-linking agent, 1 part of stabilizer, and 6 parts of distilled water, the stabilizer is EDTA-2NA; the cross-linking agent is the cross-linking agent obtained from Example 1;

the specific preparation steps are as follows:
(4-1) each raw material is weighed in proportion and reserves;
(4-2) 2 parts of HPAM and 4 parts of CPAM are mixed, 6 parts of distilled water are added and stirred well, and the stirring speed is 550 r·min$^{-1}$ to obtain the slurry II;
(4-3) 1 part of stabilizer is mixed with the slurry II and mixed well, and the stirring speed is 550 r·min$^{-1}$ to obtain the slurry III;
(4-4) the slurry III is mixed with 1 part of the cross-linking agent and stirred evenly, and the stirring speed is 550 r·min$^1$ to obtain gel F4.

EDTA is a commonly used chelating agent, the use of EDTA substances (such as EDTA, EDTA-2Na, EDTA-4Na) as stabilizers alone will cause Cr$^{3+}$ in the cross-linking agent to be chelated by EDTA to form new compounds, so that the subsequent hydroxyl bridge reaction cannot be carried out, and Cr$^{3+}$ cannot be dissociated separately to react with acrylamide substances to form gels; the chemical reaction equation of EDTA chelating Cr$^{3+}$ is as follows:

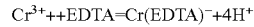

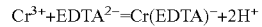

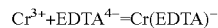

Comparison Case 2

The sealing gel with delayed gelation for well cementation is composed of 2 parts of HPAM, 4 parts of CPAM, 1 part of the cross-linking agent, 1 part of stabilizer, and 6 parts of distilled water, the cross-linking agent is a single chromium lactate, the stabilizer is the stabilizer obtained from Example 2;

(5-1) each raw material is weighed in proportion and reserves;
(5-2) 2 parts of HPAM and 4 parts of CPAM are mixed, 6 parts of distilled water are added and stirred well, and the stirring speed is 550 r·min$^{-1}$ to obtain the slurry II;
(5-3) 1 part of stabilizer is mixed with the slurry II and mixed well, and the stirring speed is 550 r·min$^{-1}$ to obtain the slurry III;
(5-4) the slurry III is mixed with 1 part of the chromium lactate and stirred evenly, and the stirring speed is 550 r·min$^4$ to obtain gel F5.

Due to the extremely low solubility of single chromium lactate, it is almost insoluble in water, so it is difficult to form a usable cross-linking agent. The product F5 is a gel formed by using chromium lactate as a cross-linking agent, it has high viscosity and low strength, it is essentially a high-viscosity polymer formed by heating acrylamide monomers, the single chromium lactate does not play a cross-linking role, and the resulting gel cannot be used normally.

Experiment Example 1

Figure 2:
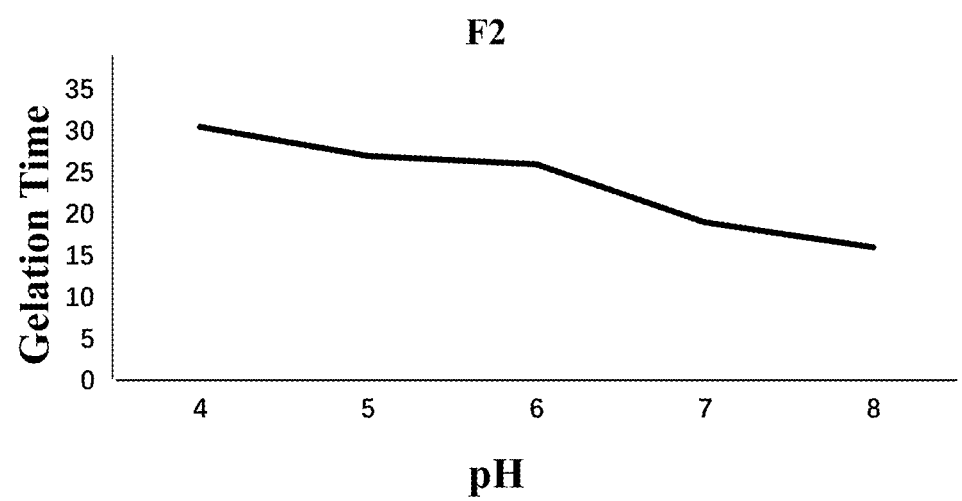
FIG. 2 is a gelation time of gel F2 under different pH conditions.
Figure 3:
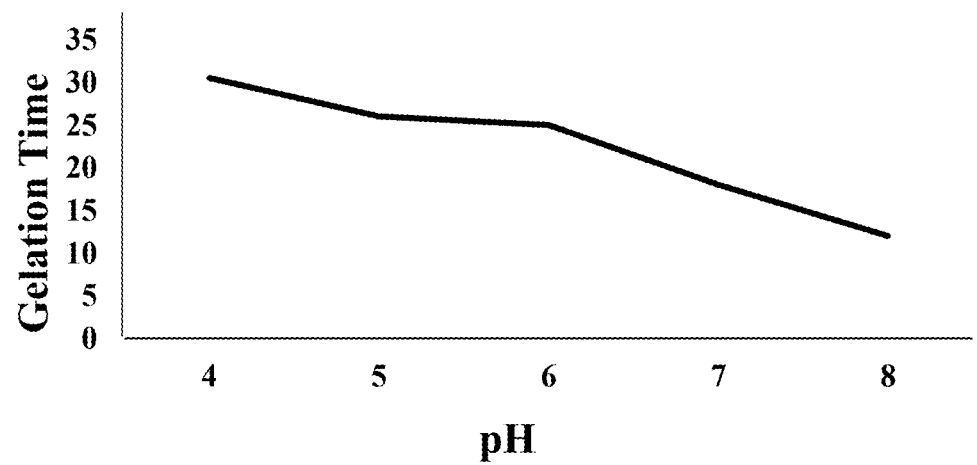
FIG. 3 is a gelation time of gel F3 under different pH conditions.

The cementing formation conditions are simulated, the temperature is set to 80° C., and the delayed glue formation time of gel F1, F2, and F3 under different pH (pH=4-8) conditions is investigated, the experimental results are shown in FIGS. 1-3; the results show that the delayed gelation effect of the gel is better under weak acid conditions. By controlling the pH environment to control the dissociation process of Cr$^{3+}$ in the cross-linking agent, it can be found that in the weak acidic environment, the dissociation of Cr$^{3+}$ is slower and the delayed gelation effect is better.

Experimental Example 2

Compressive strength is one of the important properties of cement stone; in order to test whether the gel has an impact on the subsequent cementing work after adding the pre-liquid system. The invention adopts the columnar core to carry out the compressive strength experiment, the diameter of the core column is 25 mm and the height is 50 mm, the prepared cement slurry is imported into the inverted columnar core barrel, and the end cover is tightened and sealed, it is put into the 50° C. constant temperature curing box for one day. After removing the mold, the compressive strength test of the cement block with or without gel is carried out; the test results are shown in Table 1:

TABLE 1

Test results of compressive strength of gel cement block with gel

|  | Before adding gel | After adding gel |
|---|---|---|
| Compressive strength/MPa | 8.59 | 8.73 |

It can be seen from Table 1 that the compressive strength of the cement block increases slightly after adding the gel, and it is preliminarily judged that the gel has a benign effect on the cementing work.

The above implementation cases are the better implementation methods of the invention, but the implementation methods of the invention are not limited by the above implementation cases, any other changes, modifications, substitutions, combinations, and simplifications that do not deviate from the spiritual essence and principles of the invention should be equivalent replacement methods and are included within the scope of protection of the invention.

What is claimed is:

1. A sealing gel with a delayed gelation for a well cementation, comprising 2-3 parts of anionic polyacrylamide, 3-4 parts of cationic polyacrylamide, 1 part of a stabilizer, 1 part of a cross-linking agent, and 6 parts of distilled water; wherein the stabilizer is obtained by a reaction of citric acid and ethylenediaminetetraacetic acid disodium under an action of an initiator; and the cross-linking agent is obtained by a reaction of chromium lactate and chromium nicotinate under an action of azo diisobutyl amidine hydrochloride and tetramethylethylenediamine;

wherein the initiator is sodium persulfate;

a mass ratio of the citric acid to the ethylenediaminetetraacetic acid disodium to the initiator is 2:1:1; and a mass ratio of the chromium lactate to the chromium nicotinate to the azo diisobutyl amidine hydrochloride to the tetramethylethylenediamine is 3:2:1:1.

2. A preparation method of the sealing gel with the delayed gelation for the well cementation according to claim 1, comprising the following steps:

(2-1) dissolving the anionic polyacrylamide in the distilled water and stirring evenly, and adding the cationic polyacrylamide slowly and stirring evenly to obtain a second slurry; and (2-2) adding the stabilizer and the cross-linking agent slowly to the second slurry and stirring evenly to obtain the sealing gel with the delayed gelation for the well cementation.

3. The preparation method of the sealing gel with the delayed gelation for the well cementation according to claim 2, wherein a preparation method of the stabilizer is as follows: dissolving the citric acid, the ethylenediaminetetraacetic acid disodium, and the initiator in water, stirring evenly, and heating at 70° C. for 4 h.

4. The preparation method of the sealing gel with the delayed gelation for the well cementation according to claim 2, wherein a preparation method of the cross-linking agent is as follows:

(1-1) adding the chromium lactate and the chromium nicotinate to the distilled water and stirring evenly to obtain a first slurry;

(1-2) adding the azo diisobutyl amidine hydrochloride and the tetramethylethylenediamine to the first slurry, stirring and mixing evenly, and heating at 50° C. for 4 h to obtain the cross-linking agent.

* * * * *